Dec. 25, 1945.  F. H. KNIGHT ET AL  2,391,632
UNION
Filed Jan. 21, 1944

INVENTORS
Frank H. Knight
Roy Thomas Watts
BY Barlow & Barlow
ATTORNEYS

Patented Dec. 25, 1945

2,391,632

UNITED STATES PATENT OFFICE 2,391,632

UNION

Frank H. Knight, Cranston, R. I., and Roy Thomas Watts, New York, N. Y.; said Watts assignor to said Knight Application January 21, 1944, Serial No. 519,160

6 Claims. (Cl. 285—120)

This invention relates to a union of the type used for connecting pipes or conduits together.

A union of the character here referred to is usually provided by casting two sleeves, each with an enlarged inner end of a thickness greater than the remaining portion of the sleeve. One of these enlarged portions serves as a lip to be engaged by an inturned flange on the nut while the other enlarged portion is threaded to have threaded connection with the nut. Among the various operations entering into the formation of a sleeve the casting operation is expensive.

One of the objects of this invention is to provide a union of the type referred to but of such a construction as to eliminate the casting operation.

Another object of this invention is to provide a union which may be made from continuous lengths of tubing of different sizes in a manner which will enable a union being produced by automatic machine operation without casting.

Another object of this invention is to build the enlarged portion of the sleeve union at its inner end on a tube of smaller size by applying thereto a tube of a larger size and attaching the parts together.

This invention further consists in providing a union from separate continuous lengths of tubing of different sizes by machining and finishing each of the parts ready for assembly and then assembling the different parts to provide the union, the finishing being such as is necessary for the screwing up of the seating surfaces with relation to the nut and means for drawing the parts together.

With these and other objects in view, the invention consists of certain novel features of construction, as will be more fully described and particularly pointed out in the appended claims.

In proceeding with this invention we machine and cut off from extended lengths of tubing short sections of a length suitable to form a sleeve of the union. We then machine and cut off from an extended length of tubing of greater diameter another section of shorter length which we attach to the sleeve previously formed so as to increase its diameter. In some cases the outer surface of this second section will be threaded while in other cases it will be smooth and serve as a flange on one of the sections. By this arrangement we provide each enlarged portion by separate attachment which heretofore was formed by casting to form a sleeve and its enlargement. The attachment of the larger section to the smaller section to provide the sleeve may be in any one of many different ways. The seats for providing the joints are formed similarly to those heretofore formed while the means of attaching a section to a conduit is also formed similarly to that heretofore used. The nut which is used for drawing the sections together to cause the seat to be tight is also similar to that heretofore provided.

Figure 1:
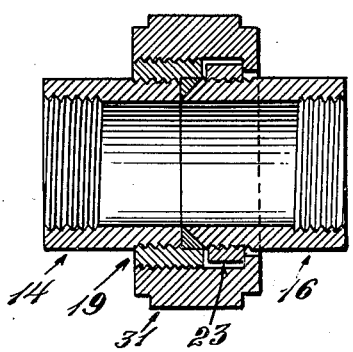
Fig. 1 is a central sectional view through the improved union.
Figure 2:
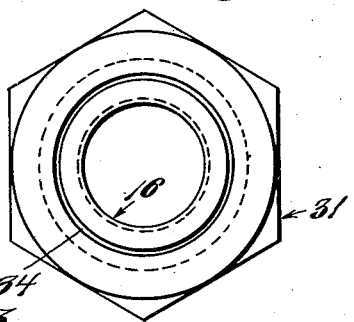
Fig. 2 is an end view thereof.
Figure 3:
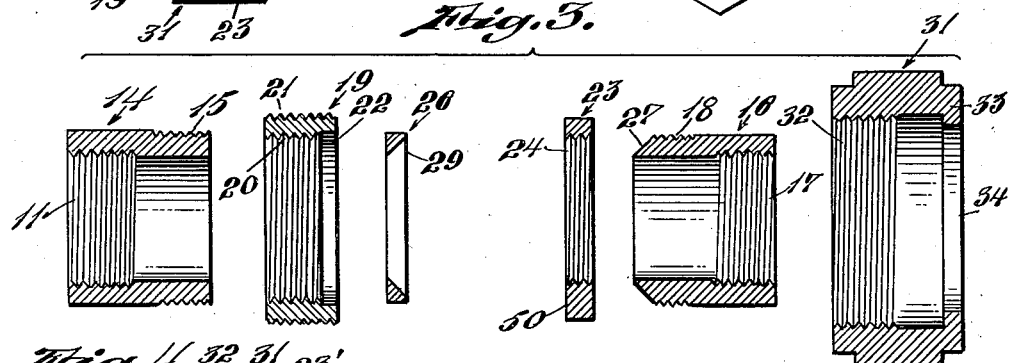
Fig. 3 is an exploded view illustrating the various parts of the union in separated relation.

With reference to the drawing, 10 designates an extended length of tube. By suitable machine operations which may be automatic the internal threads 11 may be provided or some other type of connection may be formed. The sleeve may be reduced for trueing up as at 12, then threaded if desired as at 15, and then cut off as at 13, providing a section designated generally 14. Another sleeve 16, as shown in Fig. 3, may be similarly formed with internal threads 17 at one end and external threads 18 at the other end.

By similar automatic screw machine operation a tubular member 19 may be formed with internal threads 20 and external threads 21 with or without recess 22 provided therein. This tubular member 19 is formed to fit onto the threads 15 by screwing the threads 20 thereonto to provide an enlarged portion on the union sleeve 14. A member 23 by similar automatic screw machine operations is threaded as at 24. The threads 24 fit onto the threads 18 so as to provide an enlarged portion of this sleeve 16.

A suitable seat 26 fits into the recess 22 in one of the sleeves while a seat 27 is formed on the end of sleeve 16 to fit the seat. The seats 26 and 27 present surfaces 27 and 29 so as to form a tight joint when pulled firmly together. A nut designated generally 31 is threaded as at 32 and provided with a flange 33 and opening 34 to receive the sleeve 16. The flange 33 of this nut will engage the enlarged protuberant portion formed by the member 23 while the threads 32 of this nut will engage the threads 21 of the member 19 so that as the nut is turned the two sleeves 14 and 16 will be brought together to cause their seats 27 and 29 to firmly engage and provide a tight joint.

Figure 4:
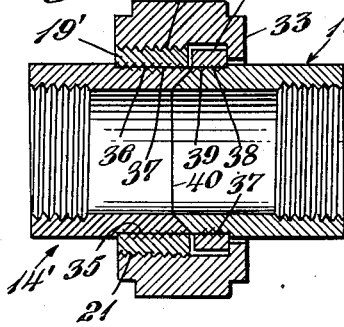
Fig. 4 is a sectional view similar to Fig. 1 but showing a modified form of union.

In some cases instead of attaching the larger tubular member to the sleeve by threading, some other means may be provided. In Fig. 4 we have illustrated a sleeve designated 14' which instead of having threads 15 is provided with a trued up smooth cylindrical surface 35. In this case the enlarged tubular member 19' is also provided with a smooth inner surface 36 and these surfaces 35 and 36 have a snug sliding engagement which may be suitably attached such for instance as by welding as at 37 so as to provide a firm joint. Threads 21 are formed on the section 19' the same as on the section 19 for reception of the threads of the nut 31. Similarly the section 16' is provided with a smooth outer surface 38 while the tubular member 23' is provided with a smooth inner surface 39 and these parts 38 and 39 have a snug sliding engagement which may be secured together by welding such as 37. The joint between the sleeve 16' and 14' is formed by machining each of the ends of these sleeves so as to provide a tight joint. The nut 31 has its flange 33 engage the enlarged member 23' while its threads 32 engage the threads 21 of the section 19' so as to draw the parts of the union together.

Figure 5:
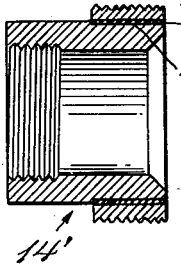
Fig. 5 is a sectional view illustrating one part of the union in modified relation.

In Fig. 5 the section 14' is provided with a tubular member 19" which fits a trued-up surface 41 and is attached thereto by the addition of some solder or brazing material as 42 for securing the parts 19" to the sleeve 14' as therein shown. The mating sleeve will be similarly formed with solder or brazing for attaching the tubular member thereto.

Figure 6:
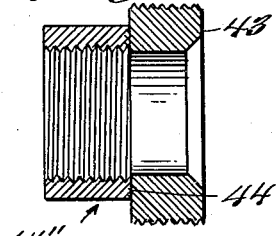
Fig. 6 is a similar sectional view of a still different modification.
Figure 8:
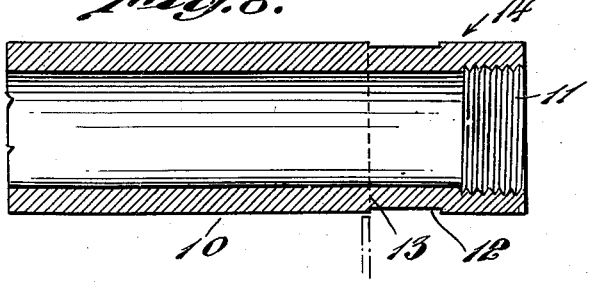
Fig. 8 is a sectional view illustrating a step in the formation of one of the sleeves of the union from an extended length of tubing.
Figure 7:
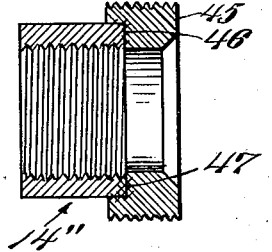
Fig. 7 is a sectional view similar to Fig. 6 of a still different modification.

In Fig. 6 we have shown a sleeve 14" while the tubular member in this instance is designated 43 and instead of encircling a part of the sleeve 14" abuts against the end thereof although it is of a thickness sufficiently great to provide an enlargement of the diameter when attached to the sleeve 14" as shown in Fig. 6. The attachment may be formed by machining the two engaging surfaces so as to provide a good joint and welding as at 44. In Fig. 7 we have illustrated a similar sleeve 14" but in this case the section 45, similar to the section 43, is recessed as at 46 so as to receive the end section 14" and is welded thereto as shown at 47. The end result is the same for functioning purposes but an increased welded area is provided for in this arrangement. The mating sleeve of the union will be similarly formed.

In most instances similar means of attachment of the members and sleeves will be had but in some cases the means may differ if desired.

From the above it will appear that we have provided telescoping or abutting sections one larger than the other to provide an enlargement of the sleeve when attached thereto. The means by which the two pieces are secured together whether it be threading, welding, soldering, brazing or other means will depend upon the strength required or joint desired, the essential part being the forming of the two pieces and attaching them together rather than trying to provide a single piece by casting. The seats which provide the seal joint may be any of various forms. We have shown only illustrative types herein. Likewise the means for attaching each of the sleeves to a conduit may be by means of threads 11, 17 or any other suitable means known in the art and which is satisfactory for the purpose desired.

By the formation of the enlarged part of each of the sleeves separate, we may true up the surfaces which are engaged so that the pull moving the seating surfaces together will be in a true line. For instance, the edge 50 of the member 23 will be sufficiently trued with relation to the seat as will also the threads 21 so that an even pull by the nut is afforded when the nut engages the edge 50 and is screwed upon the threads 21 of the enlargement of the opposite sleeve. This is an advantage which cannot be obtained by attempting to attach the separate parts such as 19 or 23 on tubular conduits at the point at which the connection is to be formed, it being desired to provide a union with the trued-up connections and then attach the sleeve part to the conduit in order that a good joint may be provided.

The method by which these operations are proceeded with will be clear from the above description. The novel union which results from this method of procedure will also be apparent from inspection of such Figures as 1 or 4.

The term tube stock as used in this specification and claims refers to any pipe-like conduit or hollow member regardless of how formed. In many cases it may be of extended length from which many sleeves or collars of the length used in the union may be cut. The thickness may vary in accordance with the pressures which are to be withstood.

The term welded as used in this specification and claims refers to a junction formed by heating to attach two parts together such as welding, fusing, brazing, soldering or the like.

We claim:

1. A union for use in coupling together conduits comprising a pair of sleeves formed of conventional tube stock, a pair of collars of tube stock of larger diameter than said sleeves and each attached in coaxial relation to one of said sleeves, one of said collars being externally threaded, and a coupling member engaging said other collar and threadingly engaging the externally threaded collar.

2. A union for use in coupling together conduits comprising a pair of sleeves formed of conventional tube stock, a pair of collars of tube stock of larger diameter than said sleeves each welded in coaxial relation to one of said sleeves, one of said collars being externally threaded, and a coupling member engaging said other collar and threadingly engaging the externally threaded collar.

3. A union for use in coupling together conduits comprising a pair of sleeves each formed of conventional tube stock, a pair of collars of tube stock of larger diameter than said sleeves each embracing one of said sleeves and attached thereto, one of said collars being externally threaded, and a coupling member engaging said other collar and threadingly engaging the externally threaded collar.

4. A union for use in coupling together conduits comprising a pair of sleeves each formed of conventional tube stock, a pair of collars of tube stock of larger diameter than said sleeves each embracing one of said sleeves and welded thereto, one of said collars being externally threaded, and a coupling member engaging said other collar and threadingly engaging the externally threaded collar.

5. A union for use in coupling together conduits comprising a pair of sleeves each formed of conventional tube stock, a pair of collars of tube stock of larger diameter than said sleeves each embracing and in threaded engagement with one of said sleeves, one of said collars being externally threaded, and a coupling member engaging said other collar and threadingly engaging the externally threaded collar.

6. A union for use in coupling together conduits comprising a pair of sleeves formed of conventional tube stock, a pair of collars of larger diameter than said sleeves each attached in coaxial relation to one of said sleeves, one of said collars being welded in end to end abutted relation to one of said sleeves, one of said collars being externally threaded, and a coupling member engaging said other collar and threadingly engaging the externally threaded collar.

FRANK H. KNIGHT.
ROY THOMAS WATTS.